J. G. SMITH.
MACHINE FOR MAKING SKEINS AND THEIR HOLDERS.
APPLICATION FILED JAN. 15, 1907.
No. 903,610.
Patented Nov. 10, 1908.
9 SHEETS—SHEET 1.
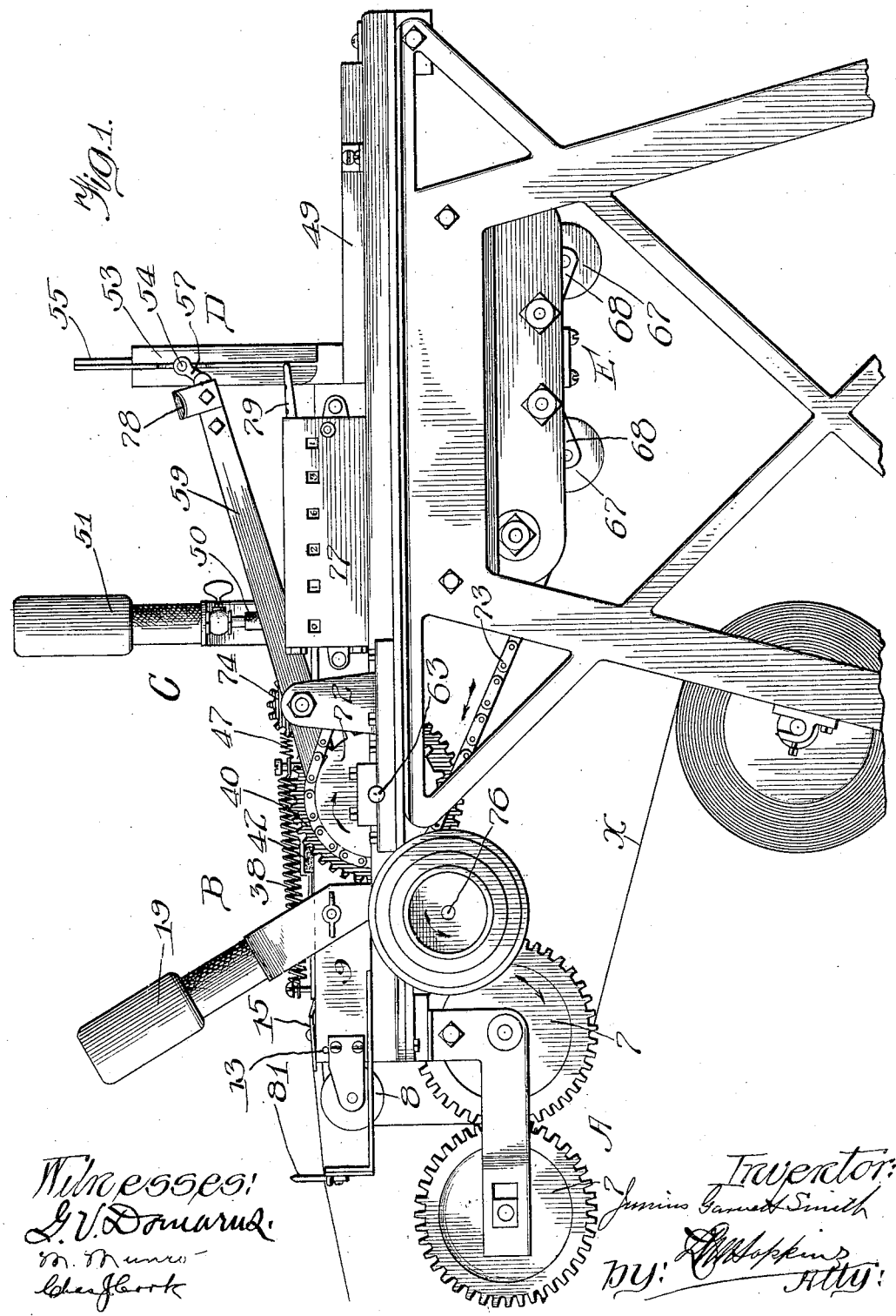

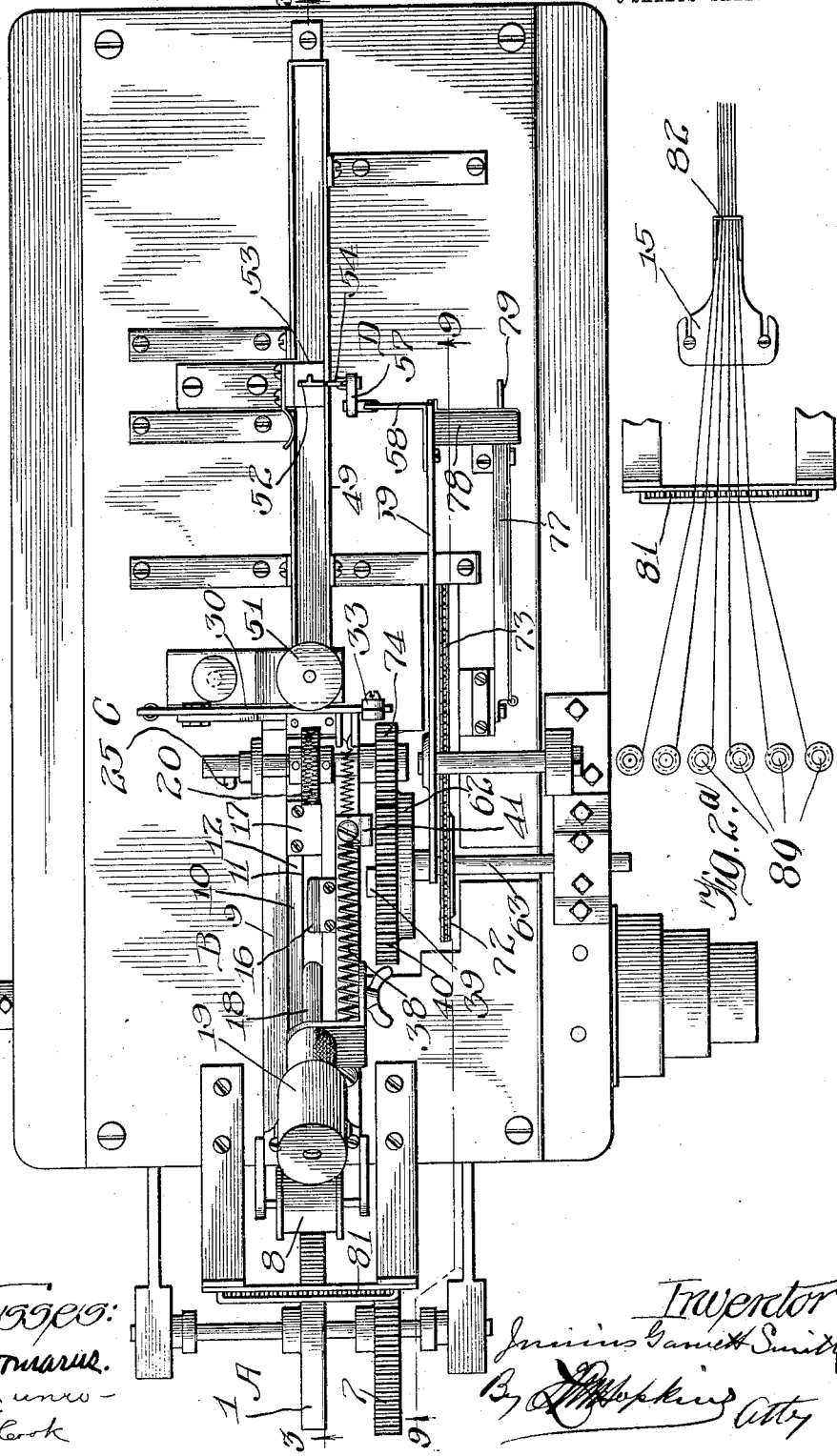

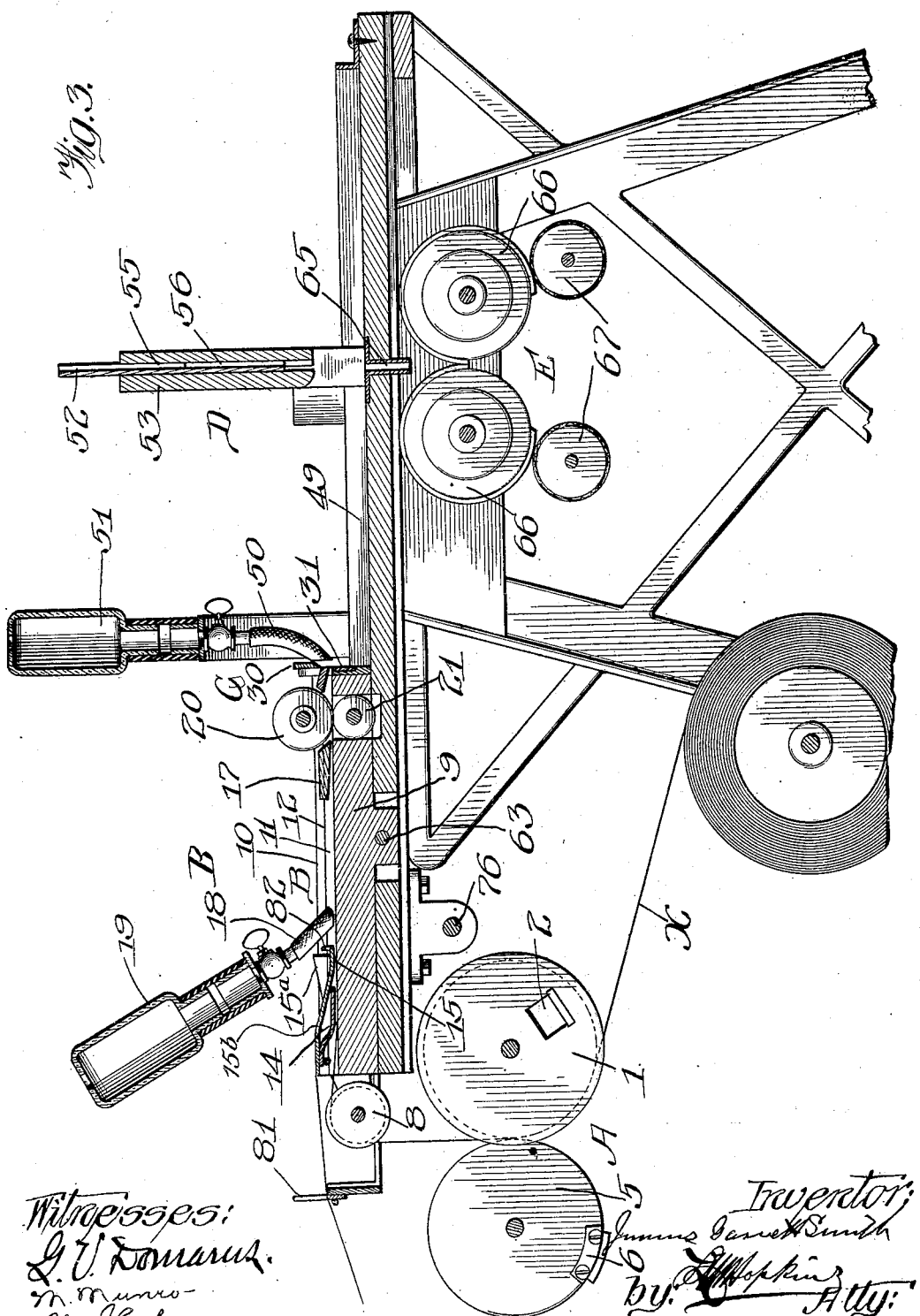

J. G. SMITH.
MACHINE FOR MAKING SKEINS AND THEIR HOLDERS.
APPLICATION FILED JAN. 15, 1907.
903,610.
Patented Nov. 10, 1908.
9 SHEETS—SHEET 4.
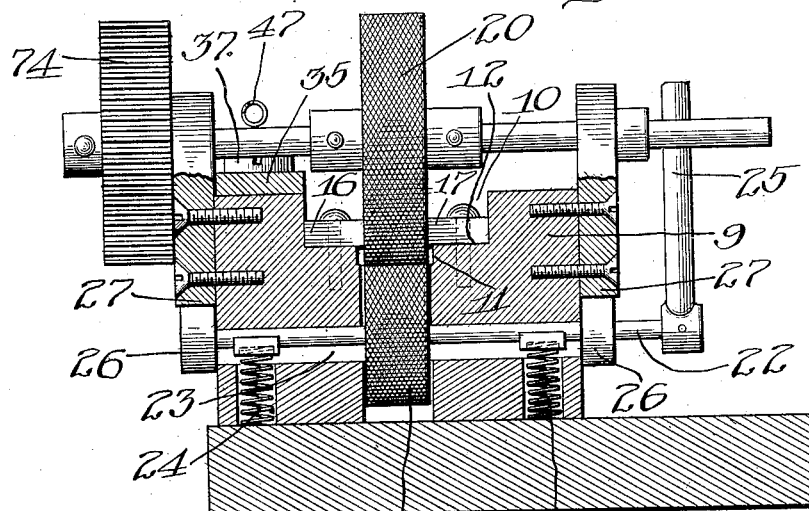
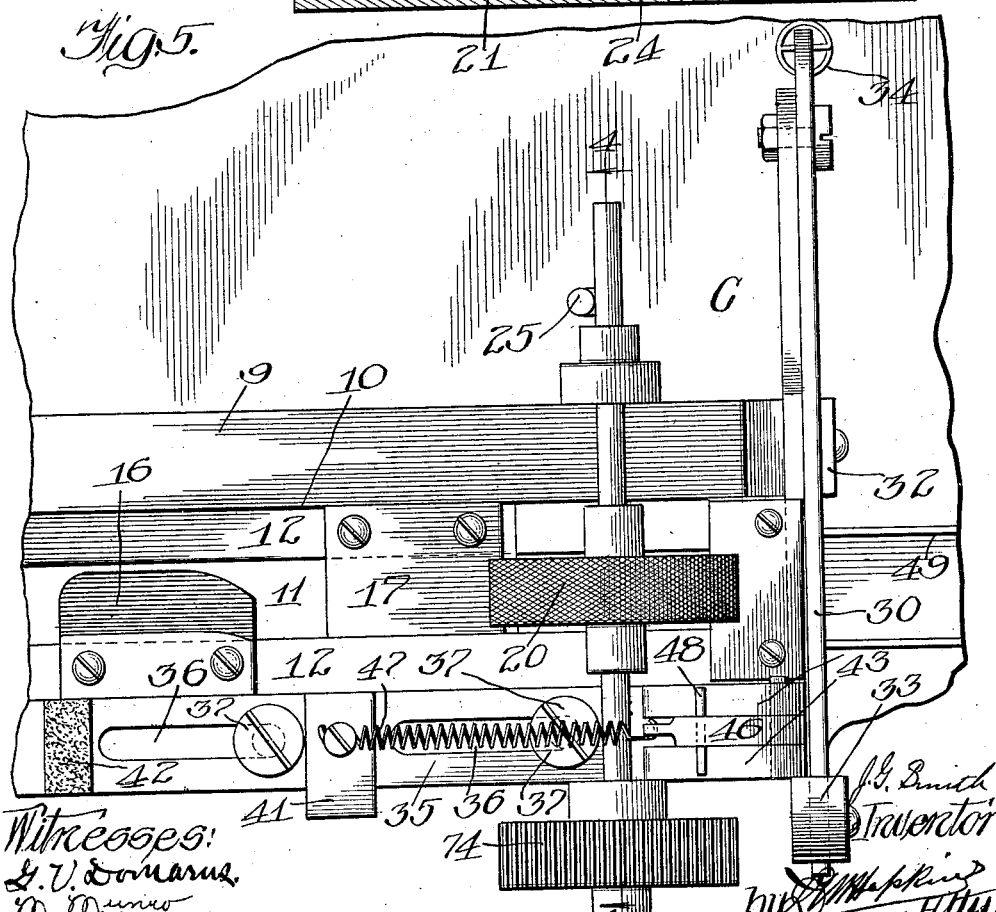

J. G. SMITH.
MACHINE FOR MAKING SKEINS AND THEIR HOLDERS.
APPLICATION FILED JAN. 15, 1907.
No. 903,610.
Patented Nov. 10, 1908.
9 SHEETS—SHEET 5.
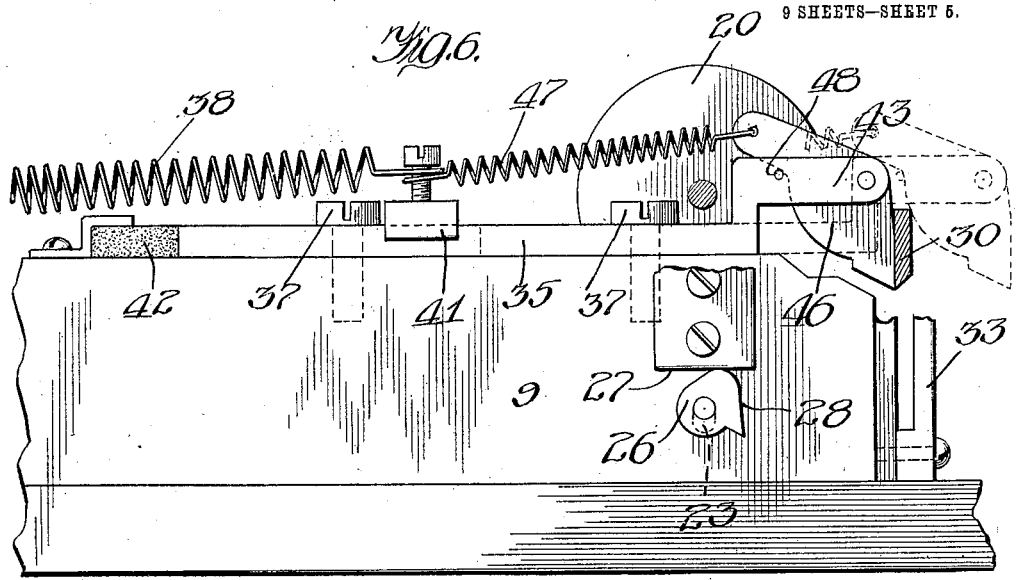
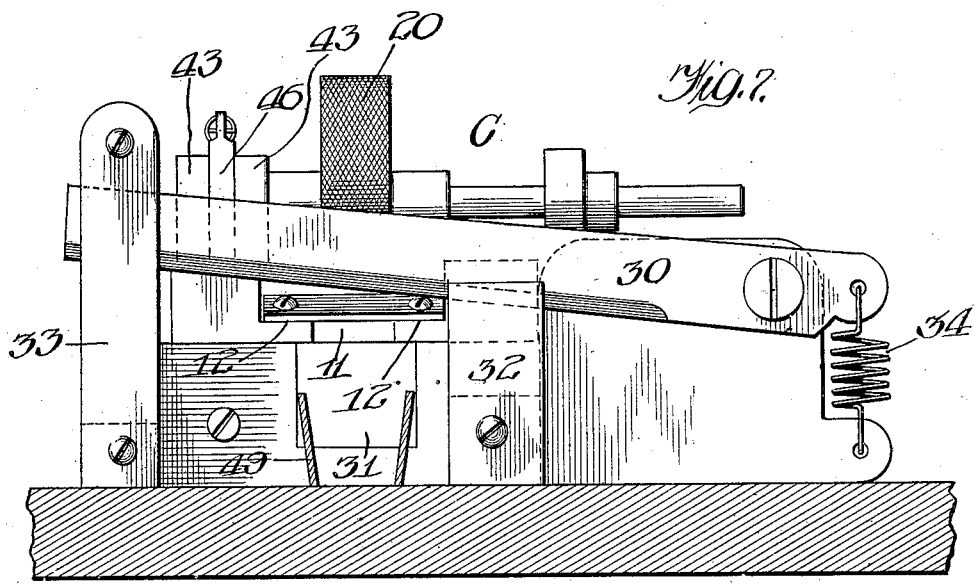
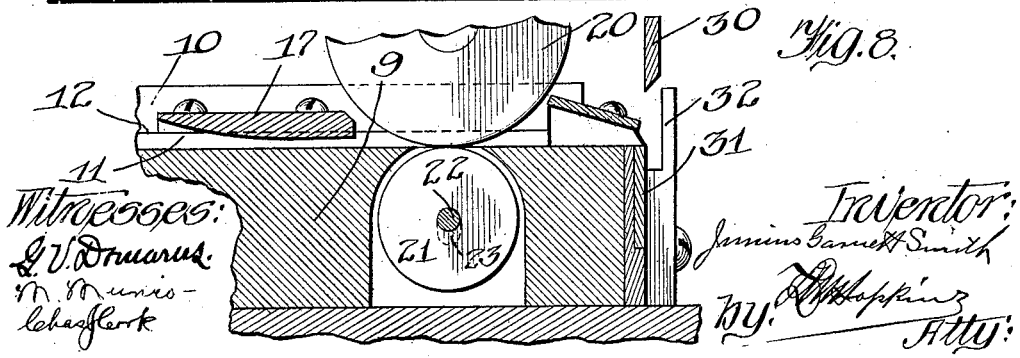

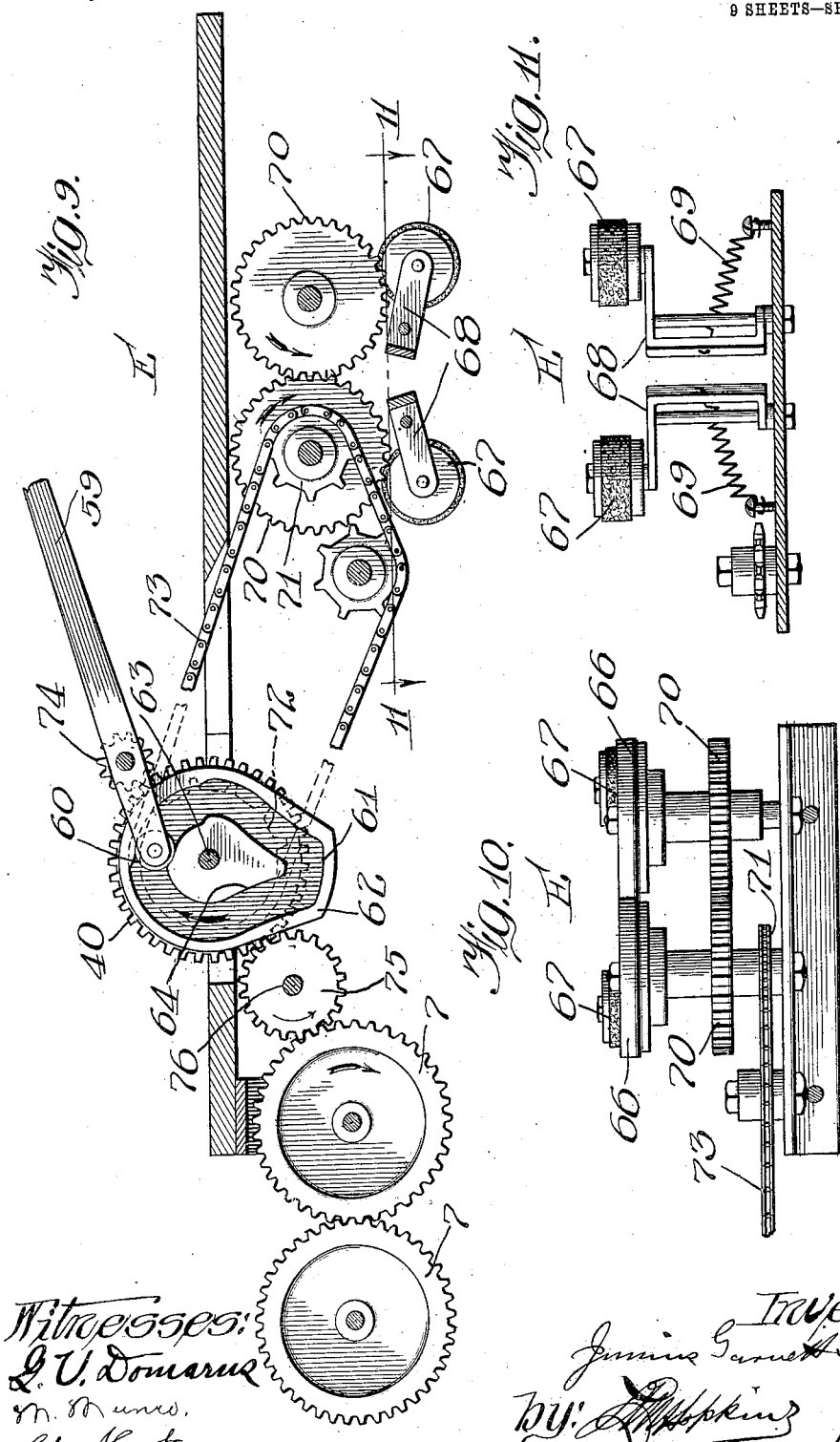

J. G. SMITH.
MACHINE FOR MAKING SKEINS AND THEIR HOLDERS.
APPLICATION FILED JAN. 15, 1907.
903,610.
Patented Nov. 10, 1908.
9 SHEETS—SHEET 7.
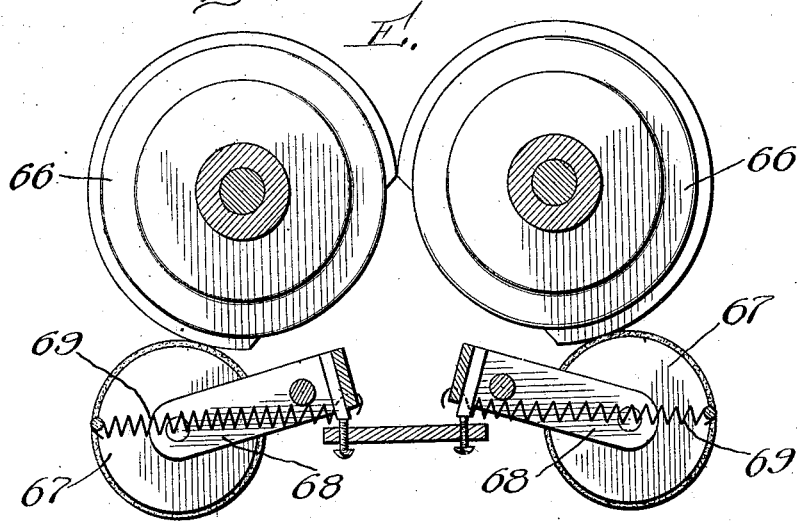
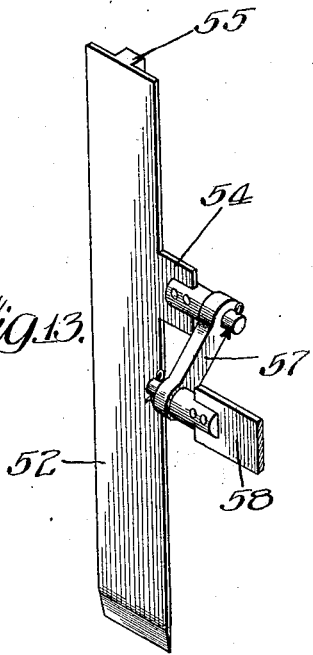
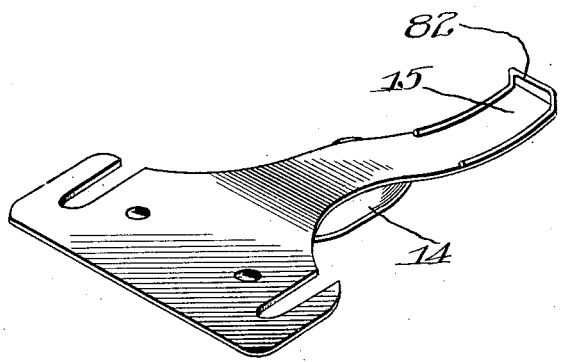
Witnesses:
Inventor:

J. G. SMITH.
MACHINE FOR MAKING SKEINS AND THEIR HOLDERS.
APPLICATION FILED JAN. 15, 1907.
903,610.
Patented Nov. 10, 1908.
9 SHEETS—SHEET 8.
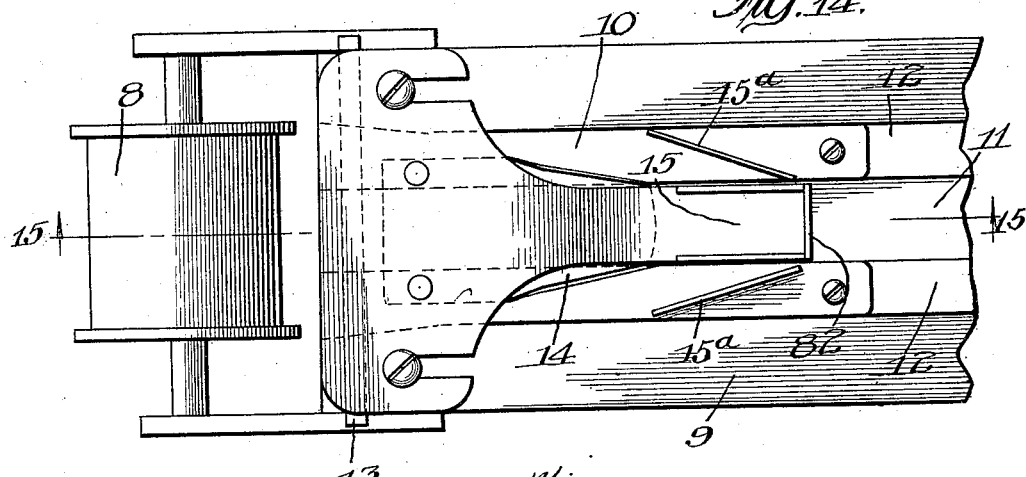
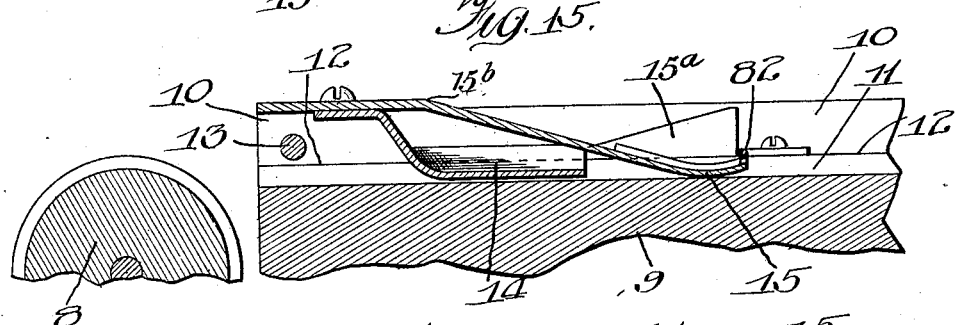
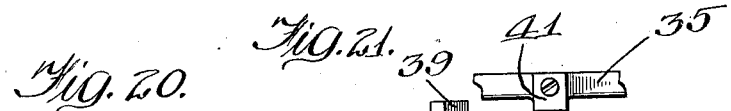
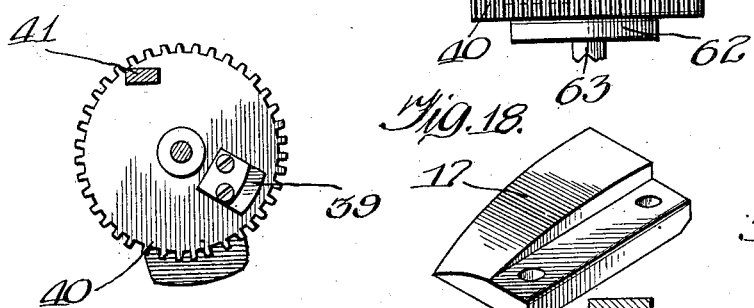
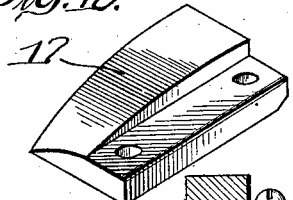
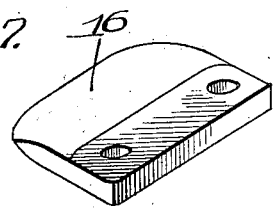
Witnesses:
Inventor:
THE NORRIS PETERS CO., WASHINGTON, D. C.

J. G. SMITH.
MACHINE FOR MAKING SKEINS AND THEIR HOLDERS.
APPLICATION FILED JAN. 15, 1907
903,610.
Patented Nov. 10, 1908.
9 SHEETS—SHEET 9.
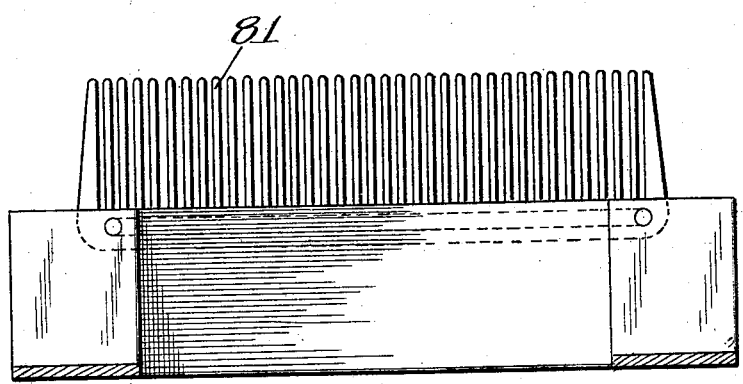
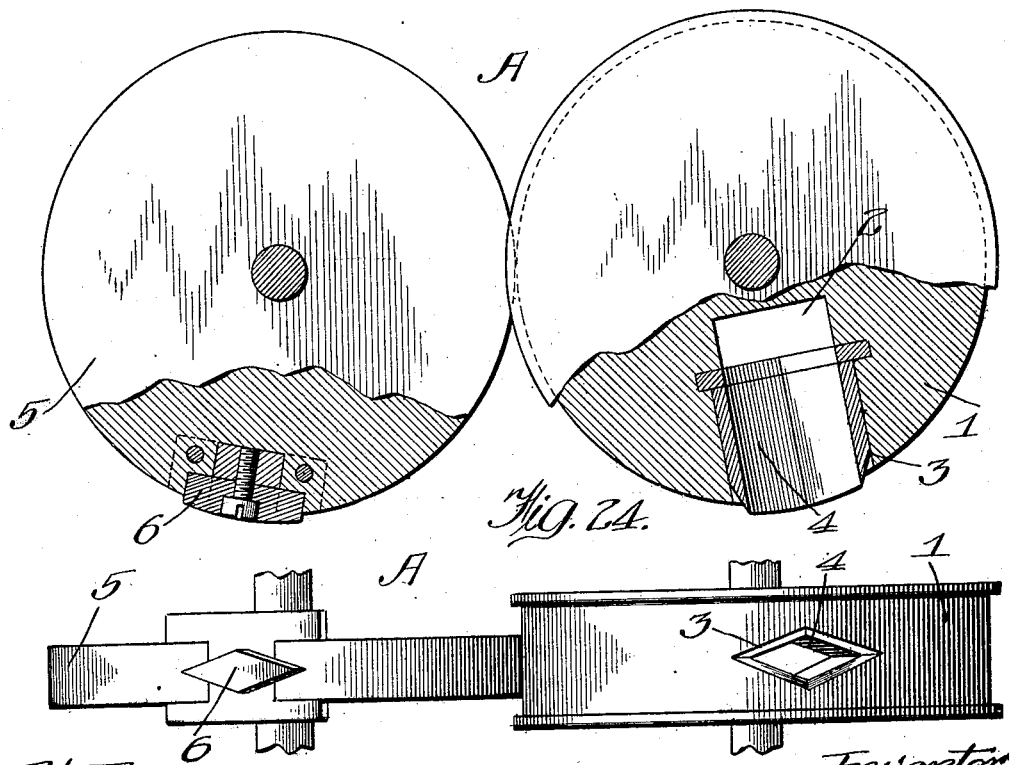
Witnesses:
Inventor:
Junius Garnett Smith
by
Atty.

UNITED STATES PATENT OFFICE.

JUNIUS GARNETT SMITH, OF CHICAGO, ILLINOIS.

MACHINE FOR MAKING SKEINS AND THEIR HOLDERS.

No. 903,610.                Specification of Letters Patent.         Patented Nov. 10, 1908.

Application filed January 15, 1907.   Serial No. 352,456.

*To all whom it may concern:*

Be it known that I, JUNIUS GARNETT SMITH, a citizen of the United States, residing at Chicago, in the county of Cook and State of Illinois, have invented certain new and useful Improvements in Machines for Making Skeins and Their Holders, of which the following is a specification.

The object of the present invention is to provide a machine for simultaneously and automatically making a skein consisting of a number of strands of thread of the length required for use and a tubular holder containing them, a skein and holder which are the product of the machine being the subject of an application which was filed November 19, 1906, Serial No. 343,984. The making of such a skein and holder involves, in the operation of the machine, the feeding to it of a ribbon of paper or other suitable material, the simultaneous feeding to it of a plurality of threads, superimposed upon the ribbon, the forming of said ribbon into a tube inclosing the threads, and the simultaneous cutting of the tube and the inclosed threads into lengths and the making of a holder of the preferred form also involves the perforation of the ribbon at regular intervals and the folding of the tube transversely after it leaves the cutter.

The invention consists in the features of novelty that are hereinafter described with reference to the accompanying drawings, which are made a part hereof and in which:

Figure 1 is a side elevation of a machine embodying the invention. Fig. 2 is a plan view thereof. Fig. 2ª is a detail, in plan, of the thread concentrator and guide. Fig. 3 is a vertical longitudinal section of the machine. Fig. 4 is a vertical transverse section thereof. Fig. 5 is a plan view showing, more particularly, the cutting mechanism. Fig. 6 is a side elevation thereof. Fig. 7 is an elevation thereof viewed from the tail end of the machine. Fig. 8 is a vertical longitudinal section thereof. Fig. 9 a side elevation of the cam for operating the plunger of the transverse folder and of the gearing for driving the printing mechanism. Fig. 10 is a plan view of the printing mechanism. Fig. 11 is a horizontal section thereof on the line 11—11, Fig. 9. Fig. 12 is a sectional elevation of the printing mechanism. Fig. 13 is a perspective view of the plunger of the transverse folder and its accessories. Fig. 14 is a plan view of part of the mechanism for folding the ribbon longitudinally. Fig. 15 is a longitudinal section thereof on the line 15—15, Fig. 14. Fig. 16 is a perspective view of one of the parts thereof. Figs. 17, 18 and 19 are detail views of other parts of the folding mechanism. Figs. 20 and 21 are detail views of parts of the cutting mechanism. Fig. 22 is an elevation of the thread-concentrator and guide. Fig. 23 is a sectional elevation of the perforator. Fig. 24 is an edge view thereof, looking upward.

The mechanism for making the holder will be described first. The paper ribbon, after leaving its spool, passes, in succession, and is subjected to the action of the following instrumentalities to-wit: A perforator A by which it is perforated at regular intervals; a folder B by which it is folded longitudinally and formed into a flat tube; a cutter C by which the completed tube is cut into uniform lengths; a transverse folder D by which the tube is folded transversely; and printing mechanism E by which any desired matter is printed on the folded tube. Of these in their order. From its spool the ribbon X passes over a grooved roll 1. This roll has an opening 2, extending through it, longitudinally, (in the direction of its axis), and also a radial opening 3 extending from the opening 2 to its periphery. In the opening 3 is arranged a female die 4 having a sharp cutting edge at its outer end. The die is hollow throughout so that the cuttings may pass through it and into the opening 2 through which they are discharged. The periphery of a second roll, 5, bears against the periphery of the roll 1. The roll 5 carries a male die or punch 6 which is adapted to enter the die 4, and the coöperation of the two dies perforates the ribbon. The two rolls are of equal diameter and are geared together by gear wheels 7 on their shafts. From the perforator A the ribbon passes over a grooved roll 8 to the longitudinal folder B. The base or body, 9, of the folder has a channel, 10, of substantially the same width as the ribbon and at the bottom of this channel it has a groove, 11, of substantially the same width as the completed tube. The bottom of the channel forms shoulders 12 at the sides of the groove to which some of the parts are attached.

At the entrance to the channel is placed a horizontal rod 13 which serves to hold the ribbon flat at this point. After passing the rod 13 the ribbon encounters a scoop-shaped blade, 14, the sides of which flare upward and out, and taper in the direction of the feed and it next encounters a blade, 15, which occupies the groove and is of substantially the same width as the groove, the difference being just sufficient to allow the upturned sides of the ribbon to pass between them. These blades 14 and 15 press the central longitudinal portion of the ribbon firmly against the bottom of the groove and bring its outer longitudinal portions or sides into vertical positions, this action being assisted by a pair of guides, 15ª, which are secured to the shoulders 12 and converge in the direction of the feed, terminating at their forward ends in the vertical planes of the side walls of the groove. One of the vertical sides of the ribbon then passes beneath a part 16, hereinafter called a spreader, and then beneath a part 17, hereinafter called a folding block, whereby it is folded from a vertical to a horizontal position. The other side of the ribbon, upon leaving the blade 15, passes over the spreader and thence under the folding block 17 whereby it is folded over the side first aforesaid, so that the two sides overlap each other, thereby forming a flat tube. At a point in advance of the folding block 17 the discharge nozzle 18 of a receptacle 19 containing an adhesive substance extends between the two folds or sides of the ribbon and discharges a suitable quantity of said substance so that when said sides are pressed together the tube will be completed, the object of the spreader 16 being to hold the overlapping sides apart in order to admit the nozzle 18.

The shaft, 22, of the lower feed roll, 21, occupies a vertical slot, 23, in the base 9 of the folder and is held up therein, so as to hold the lower roll in working position, by a pair of coiled springs 24. For separating the rolls, the shaft, 22, is provided with a lever, 25, by which it may be turned and with cams, 26, which contact with shoulders, 27, carried by the base, 9. The cams have flat surfaces, 28, for locking them when said surfaces are in contact with the shoulders and the rolls separated. From the feed rolls the completed tube passes to the cutter C by which it is cut into uniform lengths each of which is exactly equal to the distance between the centers of adjacent perforations, or, with a perforator constructed as shown and described, each of which is exactly equal to the circumference of the die-rolls. The cutter has a pivoted blade 30 and a lower blade 31 with which it coöperates. The pivoted blade works in guides 32, 33, whereby it is confined to movement in a vertical plane. A spring 34 holds it normally in elevated position and returns it thereto with a quick movement after each cutting operation. It is depressed, in opposition to the resistance of the spring 34, with an even quicker movement by the following mechanism. 35 is a slide mounted upon the base, 9, and having longitudinal slots, 36, and 37 are screws passing through the slots and tapped into the base by which the slide is held in place so as to be capable of to and fro endwise movement. A heavy coiled spring, 38, has one end attached to the base and the other end attached to the slide for holding the latter normally in retracted position and for returning it thereto with a quick movement upon the disengagement of a tappet 39, on a gear wheel 40 and a lug 41 carried by the slide. As the wheel rotates the tappet 39 engages the lug 41 and advances the slide in opposition to the resistance of the spring 38, and as the wheel continues to rotate the tappet will disengage the lug and thereupon the spring, 38, will retract the slide with a quick movement. An elastic buffer, 42, against which the end of the slide strikes dissipates the shock. The rear end, 43, of the slide is offset vertically to a sufficient height to enable it to pass over the blade as the slide is advanced. To this offset end is pivoted a cam, 46, which is held in normal position, and returned thereto when released, by a delicate spring, 47, one end of which is attached to the cam and the other end to the slide, a stop pin, 48, being provided for preventing the further movement of the cam, under the influence of the spring, when its normal position is reached. As the slide is advanced, the back of the cam, which is flat, comes in contact with the blade 30. As it continues to advance the pressure of the blade against the cam will rock the cam on its center until its flat back is horizontal and rests upon the top of the blade and during the continued movement will slide thereon. An instant before the tappet, 39, disengages the lug, 41, the back of the cam will escape from the blade and the spring 47 will move the cam to the position shown by dotted lines in Fig. 6. In this position it is wholly on the rear side of the blade with its cam face presented thereto. An instant thereafter the tappet disengages the lug, and the spring 38 retracts the slide with a quick movement. During this movement the cam engages the top of the blade and depresses it with an equally quick movement and it is immediately lifted to normal position by the spring 34. The die-rolls and the tappet wheel 40 make the same number of revolutions per minute, and the die-rolls have the same number of dies as the tappet wheel has tappets so that the tube will be cut into lengths equal to the distance between the centers of adjacent perforations made by the dies. In the drawings the die-rolls have but one set of dies and the tappet wheel has but one tappet so that the tube will be cut into lengths equal to the circumference of the die-rolls. The dies and tappets may be so placed with relation to each other that the tube will be cut through the center of each perforation, and this will result in a V-shaped notch at each end of the tube, but they are preferably placed in such relative positions that the tube will be cut exactly midway between adjacent perforations.

For making tubes of shorter lengths, a plurality of coöperating dies and a corresponding number of tappets are used. As the completed tube leaves the groove 11 it enters a receiving trough 49, passing the discharge nozzle 50 of a receptacle 51, containing an adhesive material which it applies to the two-ply side of the tube. As soon as the cutter has cut off a length of the tube the operation of the transverse folder D commences. This folder has a vertically reciprocable blade 52 which occupies a slot in a guide 53. The slot is open at one side of the guide for admitting the shank 54 by which the blade is connected with its operating mechanism and in order to prevent the blade from falling out it is provided with a spline 55 occupying a groove 56 in the guide. The shank 54 is connected by a link 57 with a laterally projecting end 58 of the longer arm of a lever 59, the shorter arm of which carries an anti-friction roller 60 occupying a groove 61 of a cam 62 carried by the shaft 63 of the wheel 40, or, if desired, made integral with the wheel. The cam is so shaped and its operation so timed with relation to the operation of the other parts, that the instant the tappet 39 disengages the lug 41— or, in other words, the instant the cutter cuts off a length of the completed tube the rise 64 of the cam will engage the anti-friction roller 60 and through the medium of the lever 59 force the blade 52 downward. Its lower end will engage the tube at its middle and force it through an opening 65 in the bottom of the trough 49, whereby it is doubled upon itself, and forced into the bite of a pair of rolls 66, whereupon the opposite side of the cam lifts the blade. The rolls 66 are, in fact, the type rolls of the printing mechanism E, but they serve the additional function of pressing the two parts of the doubled tube together so as to cause them to adhere. The inking rolls 67 are mounted in swinging frames 68 and pressed against the type rolls by springs 69. The type rolls are geared together by gear wheels 70 on their shafts and the shaft of one of them carries a sprocket wheel 71 which derives movement from a sprocket wheel 72 on the shaft 63 through the medium of a sprocket chain 73. The gear wheel 40 meshes with a pinion 74 on the shaft of the upper feed roll 20 for driving it at the same surface speed as the die-rolls. The wheel 40 has the same number of teeth as the gear wheels 7 and derives its motion from a gear wheel 75 on the main shaft 76 from which the gear wheels 7 also derive their motion.

77 is a register for registering the number of holders made. It is operated by a finger 78 carried by the lever 59 and arranged to strike the operating lever 79 of the register.

The elements necessary for forming the skein are few and of simple construction. They are, a number of spindles, 80, or other holders, for as many spools of thread as there are to be strands of thread in the skein, each strand being drawn from a separate spool, and means for concentrating the threads, as they come from the spools and guiding them into the folder in positions to be inclosed by the tube during the process of its formation. The means for concentrating the threads consists of a part 81, resembling a comb and having teeth between which the threads pass, whereby they are partially concentrated, or made to converge, and a guide, 82, carried by the blade 15, through which the threads pass and by which they are further concentrated and guided on to the ribbon before it is folded into a tube.

In "threading" the machine for the initial operation, the threads are laid between the teeth of the comb, then passed through the guide 82, and then secured to the ribbon, care being taken to have them lie side by side, as nearly parallel as possible, and preferably in a single layer or plane. Notwithstanding the convergence of the threads from the comb to the guide, their substantial parallelism after passing the guide is maintained by reason of the fact that the guide is so located with relation to two points on opposite sides of it that it deflects the threads out of a straight line drawn between said points and this deflection of the threads avoids any tendency of one of them to ride up upon another. As shown in the drawing, these two points are a point $15^b$, on the stock of the blade 15, and a point somewhere between the guide and the feed rolls to which the threads pass in a straight line after leaving the guide.

When the machine is "threaded" and is once in operation and both the ribbon and the threads are in the bite of the feed rolls they will be simultaneously drawn into the machine at the same rate and the threads will maintain their parallelism and also remain in a single layer, so that in the completed article the "skein" consists of a number of parallel threads of the same length as the tube, lying in the tube in a single course or layer.

What I claim as new is:

1. In a machine for simultaneously making skeins of thread and tubular holders loosely inclosing them, the combination of means for simultaneously drawing into the machine the paper of which the tubular holder is to be formed and a plurality of threads, and means for forming the paper into a tube inclosing the threads loosely, leaving them free to be drawn out as required for use.

2. In a machine for simultaneously making skeins of thread and tubular holders loosely inclosing them, the combination of means for simultaneously drawing into the machine the paper of which the tubular holder is to be formed and a plurality of threads, means for forming the paper into a tube inclosing the threads loosely, and means for simultaneously cutting the tube and inclosed threads into lengths.

3. In a machine for simultaneously making skeins of thread and tubular holders loosely inclosing them, the combination of means for simultaneously drawing into the machine the paper of which the tubular holder is to be formed and a plurality of threads, means for forming the paper into a tube inclosing the threads loosely, means for simultaneously cutting the tube and inclosed threads into lengths, and means for folding each length transversely.

4. In a machine for simultaneously making skeins of thread and tubular holders loosely inclosing them, the combination of means for simultaneously drawing into the machine the paper of which the tubular holder is to be formed and a plurality of threads, means for forming the paper into a tube inclosing the threads loosely, means for simultaneously cutting the tube and inclosed threads into lengths, means for folding each length transversely and means for securing the sides of the tube together on opposite sides of the fold.

5. In a machine for simultaneously making skeins of thread and tubular holders loosely inclosing them, the combination of means for simultaneously drawing into the machine the paper of which the tubular holder is to be formed and a plurality of threads, means for forming the paper into a tube inclosing the threads loosely, means for simultaneously cutting the tube and inclosed threads into lengths, means for applying an adhesive substance to one side of the tube, means for folding each length transversely, and a pair of rolls into the bite of which the folded tube is delivered.

6. In a machine for simultaneously making skeins of thread and tubular holders inclosing them, the combination of means for simultaneously drawing into the machine the paper of which the tubular holder is to be formed and a plurality of threads, means for concentrating the threads and means for forming the paper into a tube inclosing the concentrated threads loosely, leaving them free to be drawn out.

7. In a machine for simultaneously making skeins of thread and tubular holders loosely inclosing them, the combination of means for simultaneously drawing into the machine the paper of which the tubular holder is to be formed and a plurality of threads, means for concentrating the threads, and means for forming the paper into a tube inclosing the concentrated threads loosely, said concentrating means having a comb which partially concentrates the threads and a guide which further concentrates them and guides them onto the paper before it is formed into a tube.

8. In a machine for simultaneously making skeins of thread and tubular holders loosely inclosing them, the combination of means for simultaneously drawing into the machine the paper of which the tubular holder is to be formed and a plurality of threads, means for concentrating the threads, and means for forming the paper into a tube inclosing the concentrated threads loosely, said concentrated means having a comb which partially concentrates the threads and a guide which further concentrates them and guides them on to the paper before it is formed into a tube, said guide having a straight surface on which the threads are laid in a single course or layer.

9. In a machine for simultaneously making skeins of thread and tubular holders loosely inclosing them, the combination of means for simultaneously drawing into the machine the paper of which the tubular holder is to be formed, and a plurality of threads, means for concentrating the threads, and means for forming the paper into a tube inclosing the concentrated threads loosely, said concentrating means having a comb which partially concentrates the threads and a guide which further concentrates the threads and guides them on to the paper before it is formed into a tube, said guide having a straight surface located at one side of a straight line between two points on opposite sides of the guide.

10. In a machine for simultaneously making skeins of thread and tubular holders loosely inclosing them, the combination of means for simultaneously drawing into the machine the paper of which the tubular holder is to be formed and a plurality of threads, means for supporting a plurality of spools from which said threads are respectively drawn, means for concentrating the threads after leaving the spools and means for forming the paper into a tube inclosing the concentrated threads loosely.

11. In a machine for simultaneously making skeins of thread and tubular holders loosely inclosing them, the combination of means for drawing into the machine the paper of which the holder is to be formed and a plurality of threads, means for perforating the paper, and means for forming the perforated paper into a tube loosely inclosing the threads.

12. In a machine for simultaneously making skeins of thread and tubular holders loosely inclosing them, the combination of means for drawing into the machine the paper of which the holder is to be formed and a plurality of threads, means for perforating the paper, means for forming the perforated paper into a tube loosely inclosing the threads, and means for simultaneously cutting the tube and inclosed threads into lengths equal to the distance between the centers of adjacent perforations.

13. In a machine for simultaneously making skeins of thread and tubular holders loosely inclosing them, the combination of means for drawing into the machine the paper of which the holder is to be formed and a plurality of threads, means for perforating the paper, means for forming the perforated paper into a tube loosely inclosing the threads, and means for cutting the tube and inclosed threads midway between adjacent perforations.

14. In a machine for simultaneously making skeins of thread and tubular holders loosely inclosing them, the combination of means for drawing into the machine the paper of which the holder is to be formed and a plurality of threads, means for perforating the paper, means for forming the perforated paper into a tube loosely inclosing the threads, means for simultaneously cutting the tube and inclosed threads into lengths equal to the distance between the centers of adjacent perforations, and means for folding each severed length transversely.

15. In a machine for simultaneously making skeins of thread and tubular holders inclosing them, the combination of means for drawing into the machine the paper of which the holder is to be made and a plurality of threads, means for perforating the paper, means for forming the perforated paper into a tube loosely inclosing the threads, means for simultaneously cutting the tubes and inclosed threads midway between adjacent perforations, and means for folding each severed length transversely at its perforation.

16. In a machine for simultaneously drawing through the machine the paper of which the holder is to be formed and a plurality of threads, a pair of rolls having dies for perforating the paper at regular intervals, and means for forming the perforated paper into a tube loosely inclosing the threads.

17. In a machine for simultaneously making skeins of thread and tubular holders loosely inclosing them, the combination of means for simultaneously drawing into the machine the paper of which the holder is to be formed and a plurality of threads, a pair of rolls having dies for perforating the paper at regular intervals, means for forming the perforated paper into a tube loosely inclosing the threads, and means for cutting the perforated tube and inclosed threads into lengths equal to the circumference of the die-rolls.

18. In a machine of the class described, the combination of a folder, means for simultaneously drawing through the folder a ribbon of paper and a plurality of threads means for concentrating the threads and guiding them on to the ribbon, said folder having means for folding the ribbon longitudinally into a tube inclosing the threads loosely, and means for simultaneously cutting the tube and inclosed thread into lengths.

19. In a machine of the class described, the combination of a folder, means for simultaneously drawing through the folder a ribbon of paper and a plurality of threads means for concentrating the threads and guiding them on to the ribbon, said folder having means for folding the ribbon longitudinally to bring its two sides together, thereby forming a tube inclosing the threads loosely, means for applying an adhesive substance to the overlapping sides of the ribbon for securing them together, and means for simultaneously cutting the tube and inclosed threads into lengths.

20. In a machine of the class described, the combination of a folder, means for simultaneously drawing through the folder a ribbon of paper and a plurality of threads means for concentrating the threads and guiding them on to the ribbon, said folder having means for folding the ribbon upon two longitudinal lines and overlapping its sides, thereby forming a flat tube inclosing the threads loosely, means for applying an adhesive substance to the overlapping sides of the ribbon, and means for simultaneously cutting the tube and inclosed threads into lengths.

21. In a machine of the class described, the combination of a folder, means for simultaneously drawing through the folder a ribbon of paper and a plurality of threads, means for concentrating the threads and guiding them on to the ribbon, said folder having a groove, means for forcing the central longitudinal portion of the ribbon into the groove, thereby turning the sides of the ribbon upward, means for folding said sides down into the groove until they overlap, thereby forming a flat tube inclosing the threads, loosely, means for applying an adhesive substance to the overlapping sides of the ribbon, and means for simultaneously cutting the tube and inclosed threads into lengths.

22. In a machine of the class described, the combination of a folder, means for simultaneously drawing through the folder a ribbon of paper and a plurality of threads means for concentrating the threads and guiding them on to the ribbon, said folder having a groove, means for forcing the central longitudinal portion of the ribbon into the groove, thereby turning the sides of the ribbon upward, a folding-block extending into the groove, and means for simultaneously cutting the resulting tube and the inclosed threads into lengths.

23. In a machine of the class described, the combination of a folder, means for simultaneously drawing through said folder a ribbon of paper and a plurality of threads, means for concentrating the threads and guiding them on to the ribbon, said folder having a groove, means for forcing the central longitudinal portion of the ribbon into the groove, thereby turning the sides of the ribbon upward, a spreader over and under which the two sides of the ribbon pass, respectively, means for applying an adhesive substance to the ribbon in the vicinity of the spreader, and means for pressing the two overlapping sides of the ribbon together.

24. In a machine of the class described the combination of a folder, means for simultaneously drawing through the folder a ribbon of paper and a plurality of threads, means for concentrating the threads and guiding them in a single layer on to the ribbon, said folder having means for folding the ribbon longitudinally into a tube inclosing the threads loosely, and means for securing the sides of the folded ribbon together.

25. In a machine of the class described, the combination of a folder, means for simultaneously drawing through the folder a ribbon of paper and a plurality of threads, means for concentrating the threads and superimposing them in a single layer upon the ribbon, the folder having means for folding the paper upon two longitudinal lines and overlapping its sides, means for securing the overlapping sides together, thereby forming a flat tube inclosing the threads, and means for simultaneously cutting the tube and inclosed threads into lengths.

26. In a machine of the class described, the combination of a folder, means for simultaneously drawing through said folder a ribbon of paper and a plurality of threads, means for concentrating the threads and superimposing them upon the ribbon, the folder having means for folding the ribbon, longitudinally, into a tube inclosing the threads loosely, and means for perforating the ribbon before it is folded.

27. In a machine of the class described, the combination of a folder, means for simultaneously drawing through the folder a ribbon of paper and a plurality of threads, means for perforating the ribbon, means for concentrating the threads and superimposing them upon the ribbon, the folder having means for folding the ribbon, longitudinally, into a tube inclosing the threads loosely, and means for simultaneously cutting the tube and inclosed threads into lengths equal to the distance between the centers of adjacent perforations.

28. In a machine of the class described, the combination of a pair of rolls, coöperating dies carried by the rolls for perforating a ribbon of paper, a folder, means for simultaneously drawing through the folder, the ribbon of paper and a plurality of threads, means for superimposing said threads upon the ribbon, the folder having means for folding the ribbon into a tube inclosing the threads, and means for simultaneously cutting the tube and inclosed threads into lengths.

29. In a machine of the class described, the combination of a folder, means for simultaneously drawing through said folder a ribbon of paper and a plurality of threads superimposed on the ribbon, the folder having means for folding the ribbon into a tube inclosing the threads, means for simultaneously cutting the tube and threads into lengths, and means for folding the several lengths transversely.

30. In a machine of the class described, the combination of a folder, means for simultaneously drawing through the folder a ribbon of paper and a plurality of threads superimposed upon the ribbon, the folder having means for folding the ribbon longitudinally into a tube inclosing the threads, means for applying an adhesive substance to the side of the tube, means for simultaneously cutting the tube and threads into lengths and means for folding each length transversely.

31. In a machine of the class described, the combination of a folder, means for simultaneously drawing through the folder a ribbon of paper and a plurality of threads superimposed upon the ribbon, the folder having means for folding the ribbon longitudinally into a tube inclosing the threads, means for applying an adhesive substance to the side of the tube, means for simultaneously cutting the tube and threads into lengths, and means for folding said lengths transversely, said folding means having a reciprocable blade, means for reciprocating it and a pair of rolls into the bite of which the blade delivers the folded tube.

JUNIUS GARNETT SMITH.

Witnesses:
T. R. McDaniel,
Henry Nujer.